(12) United States Patent     (10) Patent No.:   US 12,645,398 B2

Geukens et al.     (45) Date of Patent:     Jun. 2, 2026

(54) WRITE OPERATIONS ON A NUMBER OF PLANES

(71) Applicant: Micron Technology, Inc., Boise, ID (US)

(72) Inventors: Tom V. Geukens, Longmont, CO (US); John J. Kane, Westminster, CO (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/380,895

(22) Filed: Oct. 17, 2023

(65) Prior Publication Data

US 2024/0134570 A1     Apr. 25, 2024
US 2024/0231693 A9     Jul. 11, 2024

Related U.S. Application Data

(60) Provisional application No. 63/418,872, filed on Oct. 24, 2022.

(51) Int. Cl.
*G06F 3/06*       (2006.01)

(52) U.S. Cl.
CPC .......... *G06F 3/0659* (2013.01); *G06F 3/0604* (2013.01); *G06F 3/064* (2013.01); *G06F 3/0679* (2013.01); *G06F 2212/7203* (2013.01)

(58) Field of Classification Search
CPC ...... G06F 3/0659; G06F 3/0604; G06F 3/064; G06F 3/0679; G06F 2212/7203
See application file for complete search history.

(56) References Cited

U.S. PATENT DOCUMENTS

| | | | |
|---|---|---|---|
| 8,176,238 B2 | 5/2012 | Yu | |
| 9,760,281 B2 | 9/2017 | Ramalingam | |
| 10,459,634 B2 | 10/2019 | Benisty | |
| 10,521,118 B2 | 12/2019 | Benisty | |
| 10,628,323 B2 | 4/2020 | Moon | |
| 2009/0070547 A1* | 3/2009 | Jeong .................. | G06F 12/0246 |
| | | | 711/E12.078 |
| 2010/0017556 A1* | 1/2010 | Chin ................... | G06F 12/0246 |
| | | | 711/E12.001 |
| 2013/0326149 A1* | 12/2013 | Barrell ................ | G06F 11/1076 |
| | | | 711/135 |
| 2019/0286369 A1* | 9/2019 | Liu ........................ | G06F 3/0679 |
| 2020/0089620 A1* | 3/2020 | Hsu ..................... | G06F 12/1009 |
| 2023/0014508 A1* | 1/2023 | Kanno .................. | G06F 3/0679 |
| 2023/0409234 A1* | 12/2023 | Sharma ................ | G06F 3/0659 |

* cited by examiner

*Primary Examiner* — Kalpit Parikh

(74) *Attorney, Agent, or Firm* — Brooks, Cameron & Huebsch, PLLC

(57) ABSTRACT

Apparatuses and methods for determining performing write operations on a number of planes are provided. One example apparatus can include a controller configured to associate a first number of blocks together, wherein each of the first number of blocks are each located on different planes, receive commands to write data to a first page on the number of first blocks, and write data to the first page of each of the first number of blocks during a first time period.

16 Claims, 9 Drawing Sheets

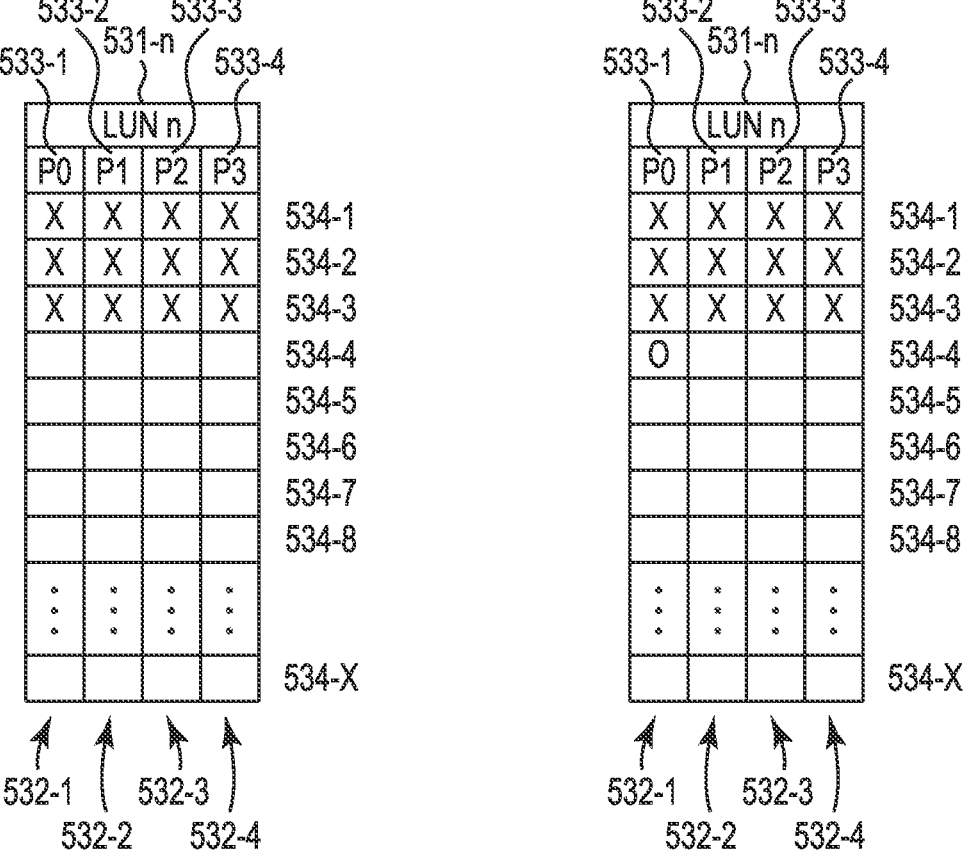
Fig. 5A          Fig. 5B

760

762

ASSOCIATING A FIRST NUMBER OF BLOCKS TOGETHER, WHEREIN EACH OF THE FIRST NUMBER OF BLOCKS ARE EACH LOCATED ON DIFFERENT PLANES

764

RECEIVING COMMANDS TO WRITE DATA TO A FIRST PAGE ON THE NUMBER OF FIRST BLOCKS

766

WRITING DATA TO THE FIRST PAGE OF EACH OF THE FIRST NUMBER OF BLOCKS DURING A FIRST TIME PERIOD

WRITE OPERATIONS ON A NUMBER OF PLANES

PRIORITY INFORMATION

This application claims the benefit of U.S. Provisional Application No. 63/418,872, filed on Oct. 24, 2022, the contents of which are incorporated herein by reference.

TECHNICAL FIELD

The present disclosure relates generally to write operations, and more particularly, to apparatuses and methods for write operations on a number of planes.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, phase change random access memory (PCRAM), resistive random access memory (RRAM), and magnetic random access memory (MRAM), among others.

Memory devices can be combined together to form a solid state drive (SSD). An SSD can include non-volatile memory, e.g., NAND flash memory and/or NOR flash memory, and/or can include volatile memory, e.g., DRAM and/or SRAM, among various other types of non-volatile and volatile memory. Flash memory devices can include memory cells storing data in a charge storage structure such as a floating gate, for instance, and may be utilized as non-volatile memory for a wide range of electronic applications. Flash memory devices typically use a one-transistor memory cell that allows for high memory densities, high reliability, and low power consumption.

An SSD can be used to replace hard disk drives as the main storage volume for a computer, as the solid state drive can have advantages over hard drives in terms of performance, size, weight, ruggedness, operating temperature range, and power consumption. For example, SSDs can have superior performance when compared to magnetic disk drives due to their lack of moving parts, which may avoid seek time, latency, and other electro-mechanical delays associated with magnetic disk drives.

Memory is utilized as volatile and non-volatile data storage for a wide range of electronic applications. Non-volatile memory may be used in, for example, personal computers, portable memory sticks, digital cameras, cellular telephones, portable music players such as MP3 players, movie players, and other electronic devices. Memory cells can be arranged into arrays, with the arrays being used in memory devices.

Memory cells in an array architecture can be programmed to a desired state. For instance, electric charge can be placed on or removed from the charge storage structure, e.g., floating gate, of a memory cell to program the cell to a particular state. For example, a single level (memory) cell (SLC) can be programmed to one of two different states, each representing a different digit of a data value, e.g., a 1 or 0. Some flash memory cells can be programmed to one of more than two states corresponding to different particular data values, e.g., 1111, 0111, 0011, 1011, 1001, 0001, 0101, 1101, 1100, 0100, 0000, 1000, 1010, 0010, 0110, or 1110. Such cells may be referred to as multi state memory cells, multiunit cells, or multilevel (memory) cells (MLCs). MLCs can provide higher density memories without increasing the number of memory cells since each cell can be programmed to states corresponding to more than one digit, e.g., more than one bit of data.

BRIEF DESCRIPTION OF THE DRAWINGS

FIGS. 5A-5D are diagrams illustrating a method for performing write operations in accordance with a number of embodiments of the present disclosure.

DETAILED DESCRIPTION

Figure 1:
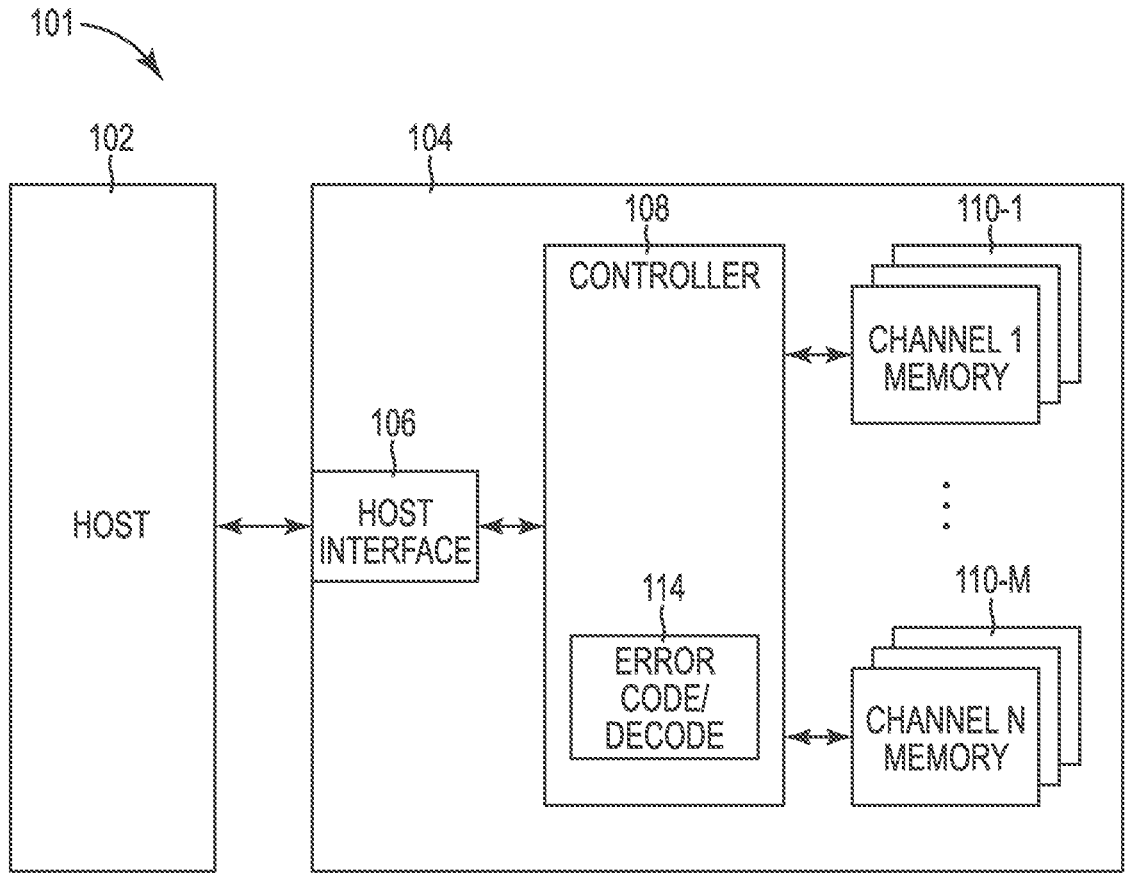
FIG. 1 is a block diagram of an apparatus in the form of a computing system including at least one memory system in accordance a number of embodiments of the present disclosure.

The present disclosure provides apparatuses and methods for performing write operations on a number of planes. One example apparatus can include a controller configured to a controller configured to associate a first number of blocks together, wherein each of the first number of blocks are each located on different planes, receive commands to write data to a first page on the number of first blocks, and write data to the first page of each of the first number of blocks during a first time period.

A memory device can include a number of logical units (LUNs) that is the smallest unit that can independently execute commands. Each LUN can include a number of planes, each of the number of planes can include a number of blocks, and each of the number of blocks can include a number of pages. Within a LUN, blocks on different planes can be programmed simultaneously (e.g., during a time period for performing a write operation (t_prog)).

In a number of embodiments, a number of blocks can be associated with each other, where each of the number of blocks can be on different planes. For example, a first block on a first plane, a second block on a second plane, a third block on a third plane, and a fourth block on a fourth plane can be associated with each other. The first, second, third, and fourth blocks can be associated with each other by executing write operations on the first, second, third, and fourth blocks simultaneously (e.g., during a t_prog), such that performing the four write operations on the first, second, third, and fourth blocks simultaneously does not increase overhead or latency in the memory device when compared to execution a write operation on just one block on one plane. Execution of write commands for any one of the first, second, third, and fourth blocks can be paused until write commands for each of the first, second, third, and fourth blocks are received.

In a number of embodiments, execution of write operations on the first, second, third, and fourth blocks that are associated with each other can be based upon a number of write commands that are received at each of the first, second, third, and fourth blocks. For example, if the first, second, and third block have received at least 2 write commands each and the fourth block has not received a write command; the first, second, and third blocks can execute commands simultaneously.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

As used herein, "a number of" something can refer to one or more such things. For example, a number of memory cells can refer to one or more memory cells. Additionally, the designators "X", "Y", and "Z" as used herein, particularly with respect to reference numerals in the drawings, indicates that a number of the particular feature so designated can be included with a number of embodiments of the present disclosure.

The figures herein follow a numbering convention in which the first bit or bits correspond to the drawing figure number and the remaining bits identify an element or component in the drawing. Similar elements or components between different figures may be identified by the use of similar bits. For example, 110 may reference element "10" in FIG. 1, and a similar element may be referenced as 310 in FIG. 3. Elements shown in the various embodiments herein can be added, exchanged, and/or eliminated so as to provide a number of additional embodiments of the present disclosure. In addition, the proportion and the relative scale of the elements provided in the figures are intended to illustrate the embodiments of the present disclosure and should not be taken in a limiting sense.

FIG. 1 is a block diagram of an apparatus in the form of a computing system 101 including at least one memory system 104 in accordance with a number of embodiments of the present disclosure. As used herein, a memory system 104, a controller 108, or a memory device 110 might also be separately considered an "apparatus". The memory system 104 can be a solid state drive (SSD), for instance, and can include a host interface 106, a controller 108, e.g., a processor and/or other control circuitry, and a number of memory devices 110-1, . . . , 110-M, e.g., solid state memory devices such as NAND flash devices, which provide a storage volume for the memory system 104. In a number of embodiments, the controller 108, a memory device 110-1 to 110-M, and/or the host interface 106 can be physically located on a single die or within a single package, e.g., a managed NAND application. Also, in a number of embodiments, a memory, e.g., memory devices 110-1 to 110-M, can include a single memory device.

Memory devices 110-1 to 110-M can be configured to store single level memory cells (SLCs) that can store 1 bit per memory cells, multi-level memory cells (MLCs) that can store 2 bits per memory cell, triple level memory cells (TLC) that can store 3 bits per memory cell, and/or quad level memory cells (QLCs) that can store 4 bits per memory cells, among other types of memory cells with various it storage levels. In some embodiments, each of the memory devices 110-1 to 110-M can include one or more arrays of memory cells such as SLCs, MLCs, TLCs, QLCs, or any combination of such. In some embodiments, a particular memory device can include an SLC portion, and an MLC portion, a TLC portion, and/or a QLC portion of memory cells. The memory cells of the memory devices 110-1 to 110-M can be grouped as pages that can refer to a logical unit of the memory device used to store data. Memory devices 110-1 to 110-M can be configured to store data in a single type of memory cells, such as SLCs, MLCs, TLCs, or QLCs. Memory devices 110-1 to 110-M can be configured to store data in a multiple types of memory cells, such as SLCs, MLCs, TLCs, or QLCs, where each block in a particular memory device is configured to store data in a particular type of memory cell and the particular memory device can have blocks of memory cells storing any combination of SLCs, MLCs, TLCs, or QLCs.

As illustrated in FIG. 1, the controller 108 can be coupled to the host interface 106 and to the memory devices 110-1, . . . , 110-M via a plurality of channels and can be used to transfer data between the memory system 104 and a host 102. The interface 106 can be in the form of a standardized interface. For example, when the memory system 104 is used for data storage in a computing system 100, the interface 106 can be a serial advanced technology attachment (SATA), peripheral component interconnect express (PCIe), or a universal serial bus (USB), among other connectors and interfaces. In general, however, interface 106 can provide an interface for passing control, address, data, and other signals between the memory system 104 and a host 102 having compatible receptors for the interface 106.

Host 102 can be a host system such as a personal laptop computer, a desktop computer, a digital camera, a mobile telephone, or a memory card reader, among various other types of hosts. Host 102 can include a system motherboard and/or backplane and can include a number of memory access devices, e.g., a number of processors.

The controller 108 can communicate with the memory devices 110-1, . . . , 110-M to control data read, write, and erase operations, among other operations. The controller 108 can include, for example, a number of components in the form of hardware and/or firmware, e.g., one or more integrated circuits, and/or software for controlling access to the number of memory devices 110-1, . . . , 110-M and/or for facilitating data transfer between the host 102 and memory devices 110-1, . . . , 110-M. For instance, in the example illustrated in FIG. 1, the controller 108 includes an error correcting code encoder/decoder component 114. However, the controller 108 can include various other components not illustrated so as not to obscure embodiments of the present disclosure. Also, the component 114 may not be components of controller 108, in some embodiments, e.g., component 114 can be independent components.

The error correcting code encoder/decoder component 114 can be an LDPC encoder/decoder, for instance, which can encode/decode user data transferred between host 102 and the memory devices 110-1, . . . , 110-M.

The memory devices 110-1, . . . , 110-M can include a number of arrays of memory cells. The arrays can be flash arrays with a NAND architecture, for example. However, embodiments are not limited to a particular type of memory array or array architecture. The memory cells can be grouped, for instance, into a number of blocks including a number of physical pages. A number of blocks can be included in a plane of memory cells and an array can include a number of planes. As one example, a memory device may be configured to store 8 KB (kilobytes) of user data per page, 128 pages of user data per block, 2048 blocks per plane, and 16 planes per device.

Figure 2:
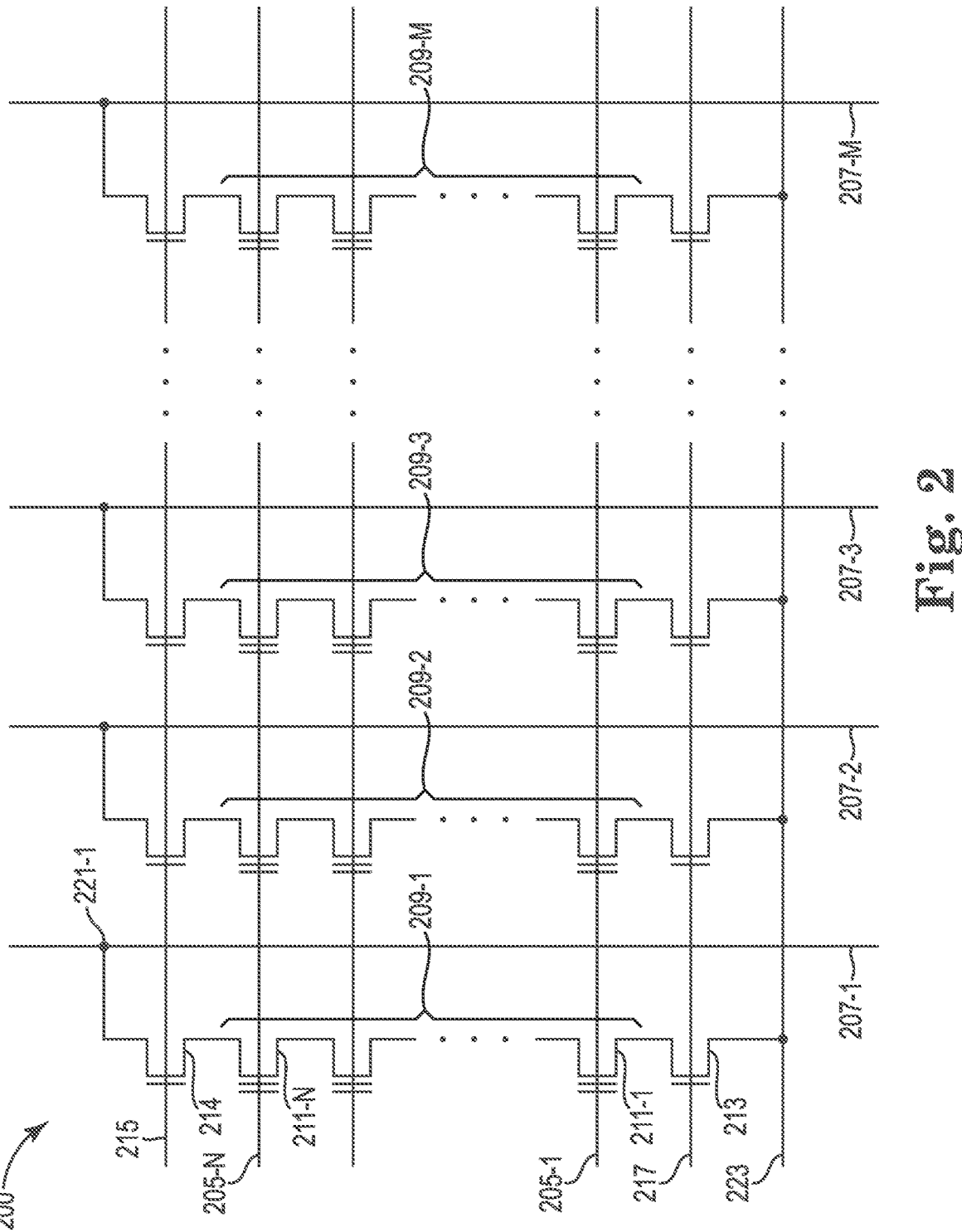
FIG. 2 illustrates a schematic diagram of a portion of a non-volatile memory array in accordance with a number of embodiments of the present disclosure.

FIG. 2 illustrates a schematic diagram of a portion of a non-volatile memory array 200 in accordance with a number of embodiments of the present disclosure. The embodiment of FIG. 2 illustrates a NAND architecture non-volatile memory array, e.g., NAND Flash. However, embodiments described herein are not limited to this example. As shown in FIG. 2, memory array 200 includes access lines, e.g., word lines 205-1, . . . , 205-N, and intersecting data lines, e.g., local bit lines, 207-1, 207-2, 207-3, . . . , 207-M. For ease of addressing in the digital environment, the number of word lines 205-1, . . . , 205-N and the number of local bit lines 207-1, 207-2, 207-3, . . . , 207-M can be some power of two, e.g., 256 word lines by 4,096 bit lines.

Memory array 200 includes NAND strings 209-1, 209-2, 209-3, . . . , 209-M. Each NAND string includes non-volatile memory cells 211-1, . . . , 211-N, each communicatively coupled to a respective word line 205-1, . . . , 205-N. Each NAND string (and its constituent memory cells) is also associated with a local bit line 207-1, 207-2, 207-3, . . . , 207-M. The non-volatile memory cells 211-1, . . . , 211-N of each NAND string 209-1, 209-2, 209-3, . . . , 209-M are connected in series source to drain between a source select gate (SGS), e.g., a field-effect transistor (FET), 213, and a drain select gate (SGD), e.g., FET, 214. Each source select gate 213 is configured to selectively couple a respective NAND string to a common source 223 responsive to a signal on source select line 217, while each drain select gate 214 is configured to selectively couple a respective NAND string to a respective bit line responsive to a signal on drain select line 215.

As shown in the embodiment illustrated in FIG. 2, a source of source select gate 213 is connected to a common source line 223. The drain of source select gate 213 is connected to the source of the memory cell 211-1 of the corresponding NAND string 209-1. The drain of drain select gate 214 is connected to bit line 207-1 of the corresponding NAND string 209-1 at drain contact 221-1. The source of drain select gate 214 is connected to the drain of the last memory cell 211-N, e.g., a floating-gate transistor, of the corresponding NAND string 409-1.

In a number of embodiments, construction of non-volatile memory cells 211-1, . . . , 211-N includes a source, a drain, a charge storage structure such as a floating gate, and a control gate. Non-volatile memory cells 211-1, . . . , 211-N have their control gates coupled to a word line, 205-1, . . . , 205-N respectively. A "column" of the non-volatile memory cells, 211-1, . . . , 211-N, make up the NAND strings 209-1, 209-2, 209-3, . . . , 209-M, and are coupled to a given local bit line 207-1, 207-2, 207-3, . . . , 207-M, respectively. A "row" of the non-volatile memory cells are those memory cells commonly coupled to a given word line 205-1, . . . , 205-N. The use of the terms "column" and "row" is not meant to imply a particular linear, e.g., vertical and/or horizontal, orientation of the non-volatile memory cells. A NOR array architecture would be similarly laid out, except that the string of memory cells would be coupled in parallel between the select gates.

Subsets of cells coupled to a selected word line, e.g., 205-1, . . . , 2105-N, can be programmed and/or read together as a page of memory cells. A programming operation, e.g., a write operation, can include applying a number of program pulses, e.g., 16V-20V, to a selected word line in order to increase the threshold voltage (Vt) of selected cells coupled to that selected access line to a desired program voltage level corresponding to a target, e.g., desired, state, e.g., charge storage state. State is equivalently referred to as "level" herein.

A read operation, which can also refer to a program verify operation, can include sensing a voltage and/or current change of a bit line coupled to a selected cell in order to determine the state of the selected cell. The states of a particular fractional bit memory cell may not correspond directly to a data value of the particular memory cell, rather the states of a group of memory cells including the particular memory cell together map to a data value having an integer number of bits. The read operation can include pre-charging a bit line and detecting the discharge when a selected cell begins to conduct.

Determining, e.g., detecting, the state of a selected cell can include providing a number of sensing signals, e.g., read voltages, to a selected word line while providing a number of voltages, e.g., read pass voltages, to the word lines coupled to the unselected cells of the string sufficient to place the unselected cells in a conducting state independent of the threshold voltage of the unselected cells. The bit line corresponding to the selected cell being read and/or verified can be detected to determine whether or not the selected cell conducts in response to the particular sensing signal applied to the selected word line. For example, the state of a selected cell can be determined by the word line voltage at which the bit line current reaches a particular reference current associated with a particular state.

SLCs can be one-bit, e.g., two-state, memory cells, or store more than two bits of data per memory cell, including fractional bits of data per memory cell. For example, a one-bit memory cell can be programmed to one of two states, e.g., P0 and P1, respectively. In operation, a number of memory cells, such as in a selected block, can be programmed such that they have a Vt level corresponding to either P0 or P1. As an example, state P0 can represent a stored data value such as binary "1". State P1 can represent a stored data value such as binary "0". However, embodiments are not limited to these data value correspondence.

QLCs can be four-bit, e.g., 16-state, memory cells, or store more than two bits of data per memory cell, including fractional bits of data per memory cell. For example, a four-bit memory cell can be programmed to one of 16 states, e.g., P0, P1, P2, P3, P4, P5, P6, P7, P8, P9, P10, P11, P12, P13, P14, and P15, respectively. In operation, a number of memory cells, such as in a selected block, can be programmed such that they have a Vt level corresponding to either P0, P1, P2, P3, P4, P5, P6, P7, P8, P9, P10, P11, P12, P13, P14, or P15. As an example, state P0 can represent a stored data value such as binary "1111". State P1 can represent a stored data value such as binary "1110". State P2 can represent a stored data value such as binary "1101". State P3 can represent a stored data value such as binary "1100". State P4 can represent a stored data value such as binary "1011". State P5 can represent a stored data value such as binary "1010". State P6 can represent a stored data value such as binary "1001". State P7 can represent a stored data value such as binary "1000". State P8 can represent a stored data value such as binary "0111". State P9 can represent a stored data value such as binary "0110". State P10 can represent a stored data value such as binary "0101". State P11 can represent a stored data value such as binary "0100". State P12 can represent a stored data value such as binary "0011". State P13 can represent a stored data value such as binary "0010". State P14 can represent a stored data value such as binary "0001". State P15 can represent a stored data value such as binary "0000". However, embodiments are not limited to these data value correspondence.

Figure 3:
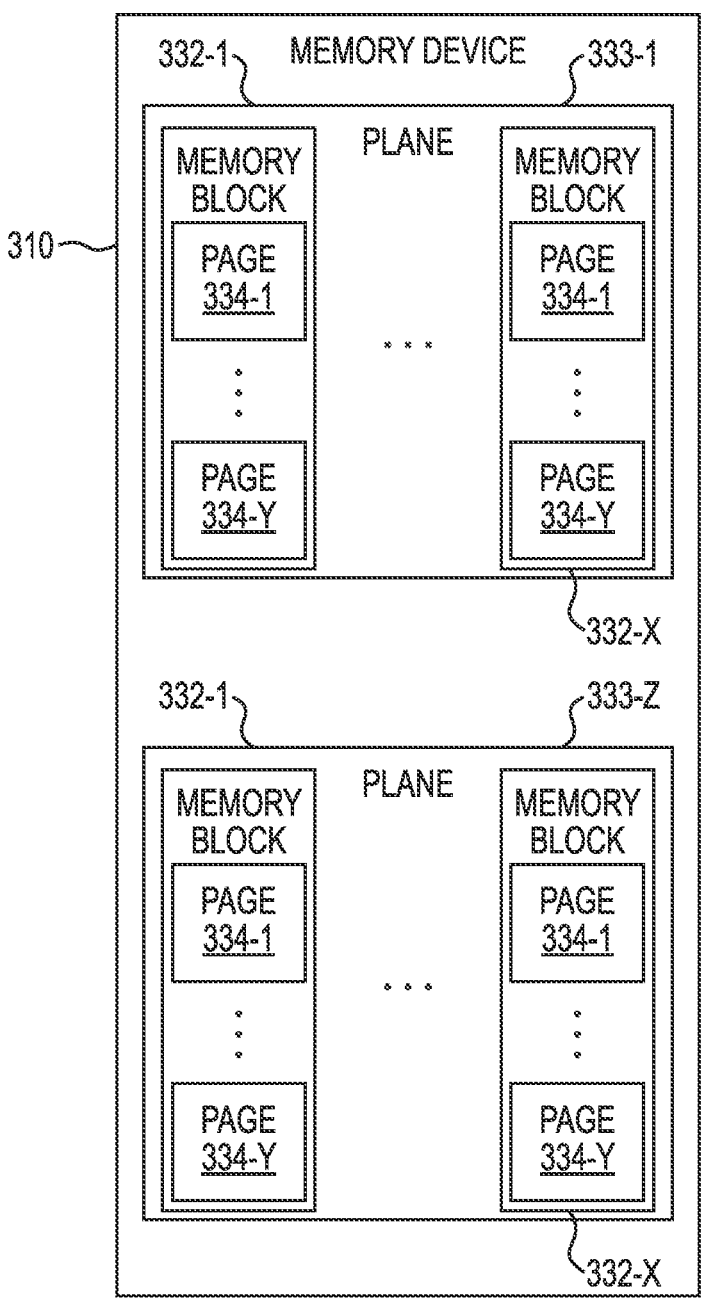
FIG. 3 is a block diagram of an apparatus in the form of a memory devices including planes, blocks, and pages in accordance with a number of embodiments of the present disclosure.

FIG. 3 is a block diagram of an apparatus in the form of a memory devices including planes, blocks, and pages in accordance with a number of embodiments of the present disclosure. In FIG. 3, memory device 310 includes planes 333-1 to 333-Z. Each of the planes 333-1 to 333-Z includes a number of blocks 332-1 to 332-X. Each of the blocks 332-1 to 332-X includes a number of pages 334-1 to 334-Y. A write operation can be performed on each of the planes simultaneously, where the write operations can be on any block on a plane, but the page number must the same on each block. For example, data can be written simultaneously to a first page on a tenth block on a first plane, to a first page on an eighth block of a second plane, to a first page of a third block of a third plane, and to a first page of a sixteenth block of fourth plane.

Figure 4:
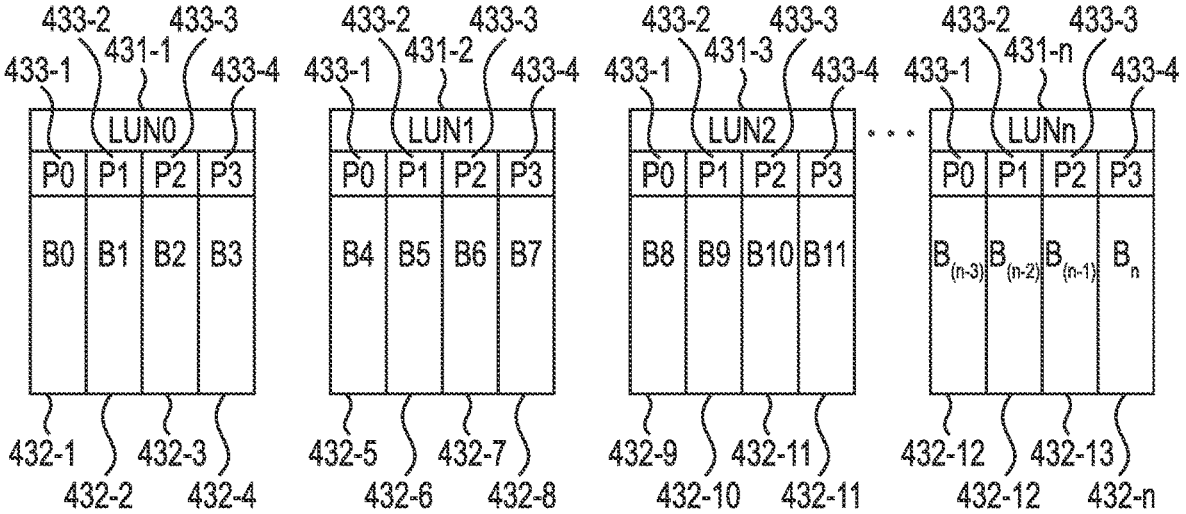
FIG. 4 illustrates blocks associated together on a number of LUNs in accordance with a number of embodiments of the present disclosure.

FIG. 4 illustrates blocks associated together on a number of LUNs in accordance with a number of embodiments of the present disclosure. A LUN can include a number of planes. In FIG. 4, LUN0 431-1 includes block B0 432-1 on plane P0 433-1, block B1 432-2 on plane P1 433-2, block B2 432-3 on plane P2 433-3, and block B3 432-4 on plane P3 433-4. Block B0 432-1 on plane P0 433-1, block B1 432-2 on plane P1 433-2, block B2 432-3 on plane P2 433-3, and block B3 432-4 on plane P3 433-4 can be associated with each other because they are each on different planes and because they receive commands with a traffic pattern where the blocks are neighbors to each other in the commands received from a host. Writes can be performed on common pages of block B0 432-1 on plane P0 433-1, block B1 432-2 on plane P1 433-2, block B2 432-3 on plane P2 433-3, and block B3 432-4 on plane P3 433-4 simultaneously (e.g., during a t_prog time period).

LUN1 431-2 includes block B4 432-5 on plane P0 433-1, block B5 432-6 on plane P1 433-2, block B6 432-7 on plane P2 433-3, and block B7 432-8 on plane P3 433-4. Block B4 432-5 on plane P0 433-1, block B5 432-6 on plane P1 433-2, block B6 432-7 on plane P2 433-3, and block B7 432-8 on plane P3 433-4 can be associated with each other because they are each on different planes and because they receive commands with a traffic pattern where the blocks are neighbors to each other in the commands received from a host. Writes can be performed on common pages of block B4 432-5 on plane P0 433-1, block B5 432-6 on plane P1 433-2, block B6 432-7 on plane P2 433-3, and block B7 432-8 on plane P3 433-4 simultaneously (e.g., during a t_prog time period).

LUN2 431-3 includes block B8 432-9 on plane P0 433-1, block B9 432-10 on plane P1 433-2, block B10 432-11 on plane P2 433-3, and block B11 432-12 on plane P3 433-4. Block B8 432-9 on plane P0 433-1, block B9 432-10 on plane P1 433-2, block B10 432-11 on plane P2 433-3, and block B11 432-12 on plane P3 433-4 can be associated with each other because they are each on different planes and because they receive commands with a traffic pattern where the blocks are neighbors to each other in the commands received from a host. Writes can be performed on common pages of block B8 432-9 on plane P0 433-1, block B9 432-10 on plane P1 433-2, block B10 432-11 on plane P2 433-3, and block B11 432-12 on plane P3 433-4 simultaneously (e.g., during a t_prog time period).

LUNn 431-n includes block B(n−3) 432-12 on plane P0 433-1, block B(n−2) 432-13 on plane P1 433-2, block B(n−1) 432-14 on plane P2 433-3, and block Bn 432-n on plane P3 433-4. Block B(n−3) 432-12 on plane P0 433-1, block B(n−2) 432-13 on plane P1 433-2, block B(n−1) 432-14 on plane P2 433-3, and block Bn 432-n on plane P3 433-4 can be associated with each other because they are each on different planes and because they receive commands with a traffic pattern where the blocks are neighbors to each other in the commands received from a host. Writes can be performed on common pages of block B(n−3) 432-12 on plane P0 433-1, block B(n−2) 432-13 on plane P1 433-2, block B(n−1) 432-14 on plane P2 433-3, and block Bn 432-n on plane P3 433-4 simultaneously (e.g., during a t_prog time period).

FIGS. 5A-5D are diagrams illustrating a method for performing write operations in accordance with a number of embodiments of the present disclosure. FIGS. 5A-5D illustrate LUN n 531-n including block 532-1 on plane P0 533-1, block 532-2 on plane P1 533-2, block 532-3 on plane P2 533-3, and block 532-4 on plane P3 533-4 that are associated with each other. A controller can be configured to execute commands on blocks 532-1, 532-2, 532-3, and 532-4 that are associated with each other such that write commands are executed on a common page number on each of the blocks 532-1, 532-2, 532-3, and 532-4 during a time period for executing write operations.

In FIG. 5A, write operations have been performed (as indicated by the Xs) on page 534-1 of each of the blocks 532-1, 532-2, 532-3, and 532-4. The write operations on page 534-1 of each of the blocks 532-1, 532-2, 532-3, and 532-4 can be performed simultaneously during a t_prog time period. A controller can pause execution of a command to write data to page 534-1 on any of the blocks 532-1, 532-2, 532-3, and 532-4 until commands to write data to page 534-1 on each of the blocks 532-1, 532-2, 532-3, and 532-4 have been received from a host.

Write operations have been performed (as indicated by the Xs) on page 534-2 of each of the blocks 532-1, 532-2, 532-3, and 532-4. The write operations on page 534-2 of each of the blocks 532-1, 532-2, 532-3, and 532-4 can be performed simultaneously during a t_prog time period. A controller can pause execution of a command to write data to page 534-2 on any of the blocks 532-1, 532-2, 532-3, and 532-4 until commands to write data to page 534-2 on each of the blocks 532-1, 532-2, 532-3, and 532-4 have been received from a host.

Write operations have been performed (as indicated by the Xs) on page 534-3 of each of the blocks 532-1, 532-2, 532-3, and 532-4. The write operations on page 534-3 of each of the blocks 532-1, 532-2, 532-3, and 532-4 can be performed simultaneously during a t_prog time period. A controller can pause execution of a command to write data to page 534-3 on any of the blocks 532-1, 532-2, 532-3, and 532-4 until commands to write data to page 534-3 on each of the blocks 532-1, 532-2, 532-3, and 532-4 have been received from a host.

In FIG. 5B, a write command for page 534-4 on block 532-1 is received and execution is paused (as indicated by O in FIG. 5B). The execution of the write command for page 534-4 on block 532-1 can be paused to allow for the controller to receive write commands for pages 534-4 on blocks 532-2, 532-3, and 532-4 in response to 532-1, 532-2, 532-3, and 532-4 being associated with each other. Execution of commands received by blocks 532-1, 532-2, 532-3, and 532-4 can be paused/timed such that that data can be written to page 534-4 on blocks 532-1, 532-2, 532-3, and 532-4 simultaneously during a t_prog time period.

Figures 5C, 5D:
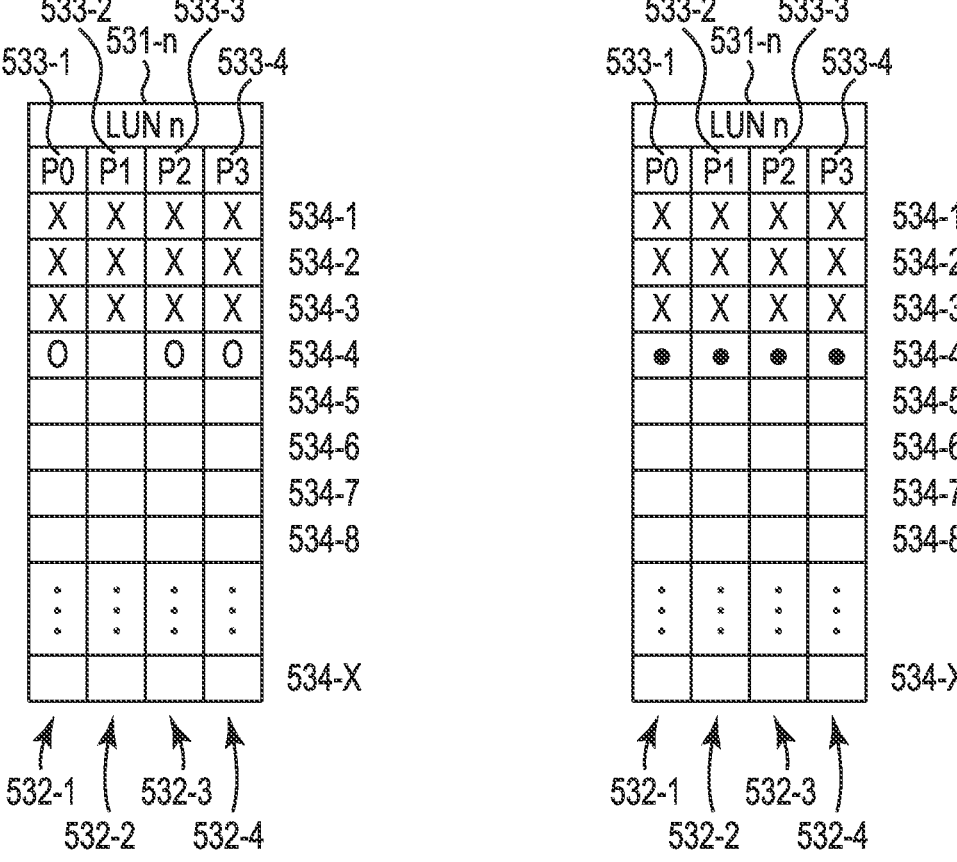

In FIG. 5C, write commands for page 534-4 on block 532-3 and block 532-4 are received and execution is paused (as indicated by Os in FIG. 5B). The execution of the write command for page 534-4 on block 532-1 is also continued to be paused. The execution of the write commands for page 534-4 on blocks 532-1, 532-3, and 532-4 can be paused to allow for the controller to receive a write command for page 534-4 on block 532-2 in response to 532-1, 532-2, 532-3, and 532-4 being associated with each other. Execution of commands received by blocks 532-1, 532-2, 532-3, and 532-4 can be paused/timed such that that data can be written to page 534-4 on blocks 532-1, 532-2, 532-3, and 532-4 simultaneously during a t_prog time period.

In FIG. 5D, write commands for page 534-4 on block 532-2 is received and the write commands for page 534-4 on blocks 532-1, 532-2, 532-3, and 532-4 are executed simultaneously during a t_prog time period in response to receiving write commands for page 534-4 on each of the blocks 532-1, 532-2, 532-3, and 532-4 (as indicated by the • symbols in FIG. 5D). The write commands for page 534-4 on blocks 532-1, 532-3, and 532-4 are no longer paused and execution of commands received for page 534-4 by blocks 532-1, 532-2, 532-3, and 532-4 can be timed such that that data can be written to page 534-4 on blocks 532-1, 532-2, 532-3, and 532-4 simultaneously during a t_prog time period.

FIGS. 6A-6D are diagrams illustrating a method for performing write operations in accordance with a number of embodiments of the present disclosure. FIGS. 6A-6D illustrate LUN n 631-_n_ including block 632-1 on plane P0 633-1, block 632-2 on plane P1 633-2, block 632-3 on plane P2 633-3, and block 632-4 on plane P3 633-4 that are associated with each other. A controller can be configured to execute commands on blocks 632-1, 632-2, 632-3, and 632-4 that are associated with each other such that write commands are executed on a common page number on each of the blocks 632-1, 632-2, 632-3, and 632-4 during a time period for executing write operations.

Figures 6A, 6B:
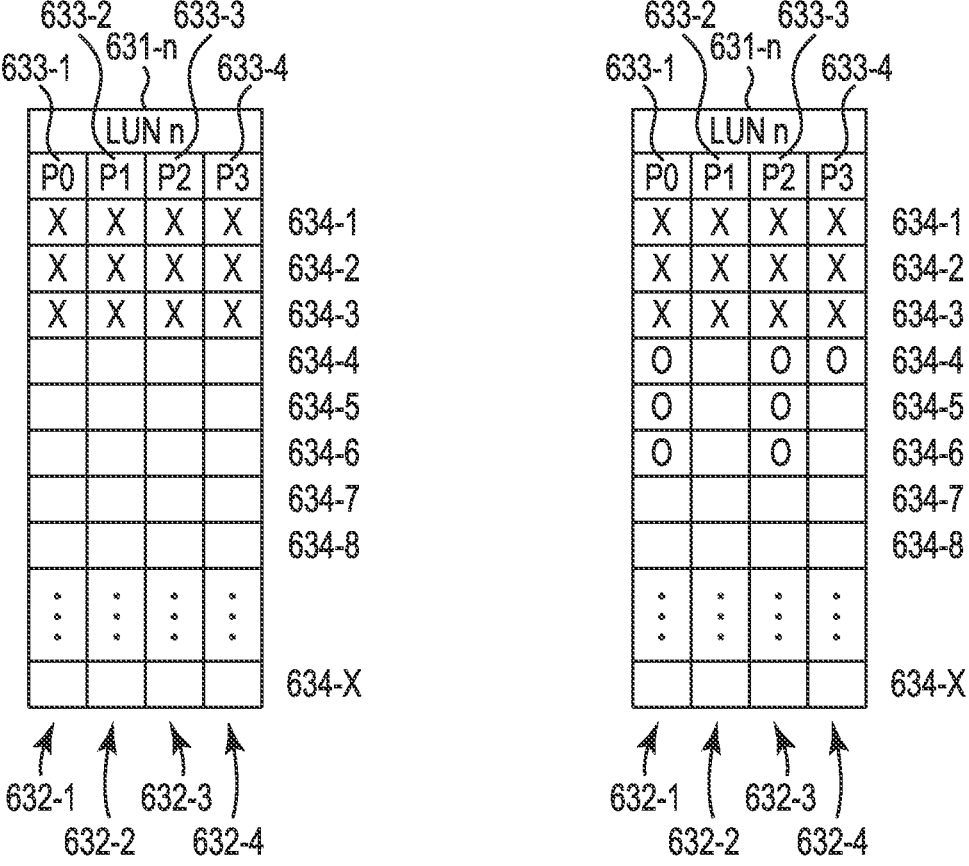
FIGS. 6A-6D are diagrams illustrating a method for performing write operations in accordance with a number of embodiments of the present disclosure.

In FIG. 6A, write operations have been performed (as indicated by the Xs) on page 634-1 of each of the blocks 632-1, 632-2, 632-3, and 632-4. The write operations on page 634-1 of each of the blocks 632-1, 632-2, 632-3, and 632-4 can be performed simultaneously during a t_prog time period. A controller can pause execution of a command to write data to page 634-1 on any of the blocks 632-1, 632-2, 632-3, and 632-4 until commands to write data to page 634-1 on each of the blocks 632-1, 632-2, 632-3, and 632-4 have been received from a host.

Write operations have been performed (as indicated by the Xs) on page 634-2 of each of the blocks 632-1, 632-2, 632-3, and 632-4. The write operations on page 634-2 of each of the blocks 632-1, 632-2, 632-3, and 632-4 can be performed simultaneously during a t_prog time period. A controller can pause execution of a command to write data to page 634-2 on any of the blocks 632-1, 632-2, 632-3, and 632-4 until commands to write data to page 634-2 on each of the blocks 632-1, 632-2, 632-3, and 632-4 have been received from a host.

Write operations have been performed (as indicated by the Xs) on page 634-3 of each of the blocks 632-1, 632-2, 632-3, and 632-4. The write operations on page 634-3 of each of the blocks 632-1, 632-2, 632-3, and 632-4 can be performed simultaneously during a t_prog time period. A controller can pause execution of a command to write data to page 634-3 on any of the blocks 632-1, 632-2, 632-3, and 632-4 until commands to write data to page 634-3 on each of the blocks 632-1, 632-2, 632-3, and 632-4 have been received from a host.

In FIG. 6B, write commands for page 634-4 on blocks 632-1, 632-3, and 632-4 are received and execution of the write commands is paused (as indicated by O in FIG. 6B). The execution of the write commands for page 634-4 on blocks 632-1, 632-3, and 632-4 can be paused to allow for the controller to receive write commands for pages 634-4 on blocks 632-2 in response to 632-1, 632-2, 632-3, and 632-4 being associated with each other.

Write commands for page 634-5 on blocks 632-1 and 632-3 are received and execution of the write commands is paused (as indicated by O in FIG. 6B). The execution of the write commands for page 634-5 on blocks 632-1 and 632-3 can be paused to allow for the controller to receive write commands for pages 634-5 on blocks 632-2 in response to 632-1, 632-2, 632-3, and 632-4 being associated with each other.

Write commands for page 634-6 on blocks 632-1 and 632-3 are received and execution of the write commands is paused (as indicated by O in FIG. 6B). The execution of the write commands for page 634-6 on blocks 632-1 and 632-3 can be paused to allow for the controller to receive write commands for pages 634-6 on blocks 632-2 in response to 632-1, 632-2, 632-3, and 632-4 being associated with each other.

Figures 6C, 6D:
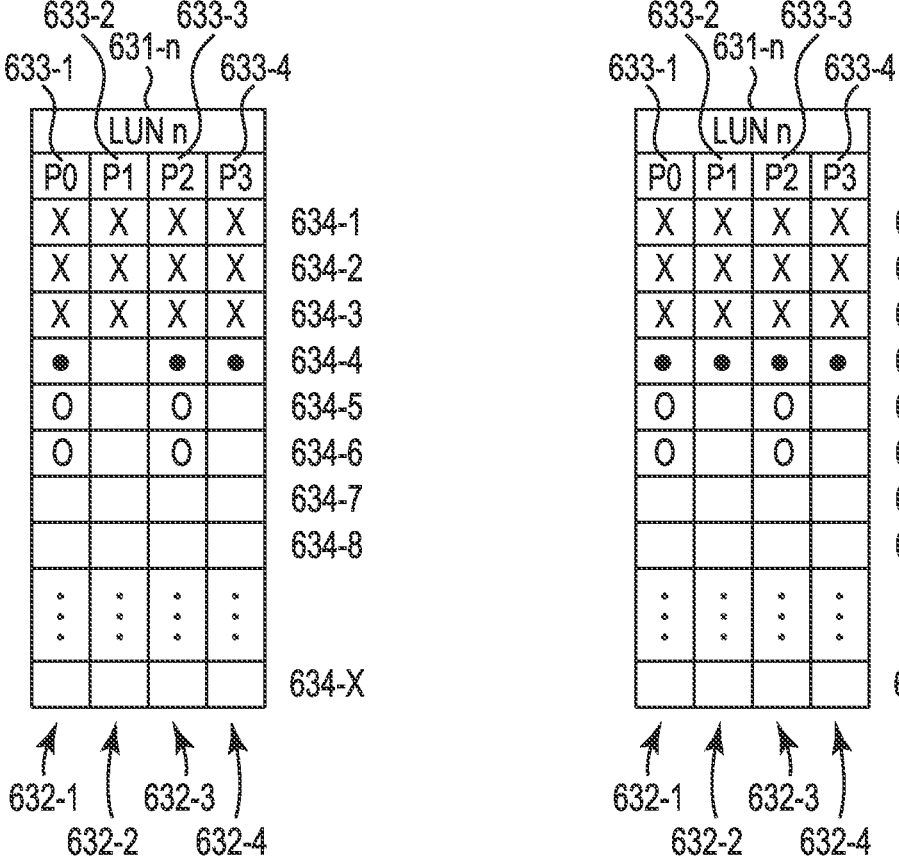

In FIG. 6C, write commands for page 634-4 on blocks 632-1, 632-3, and 632-4 are executed simultaneously during a t_prog time period (as indicated by the • symbols in FIG. 6C). The write commands for page 634-4 on blocks 632-1, 632-3, and 632-4 are no longer paused and are executed in response to receiving at least a threshold number of write commands to other pages in at least one the blocks 632-1, 632-3, and 632-4 (e.g., write commands for page 634-5 on blocks 632-1 and 632-3 and for page 634-6 on blocks 632-1 and 632-3 as shown in FIG. 6B). The threshold number of additional commands received by a block in the blocks that are associated with each other can be any number. In this example, the threshold number is 2 additional commands. Commands are not paused indefinitely until each of blocks receive a command for a particular page and write operations can be performed on one, two, or three planes on the blocks associated with each other can be performed simultaneously during a t_prog time period based on a number of commands received for the blocks associated with each other.

In FIG. 6D, write commands for page 634-4 on block 632-2 is received and the write commands for page 634-4 on 632-2 is executed during a t_prog time period (as indicated by the symbols in FIG. 6D) since write commands for page 634-4 on blocks 632-1, 632-3, and 632-4 were previously executed (as shown in FIG. 6C). The write commands for page 634-5 on blocks 632-1 and 632-3 and for page 634-5 on blocks 632-1 and 632-3 can remain paused until write commands for 634-5 on blocks 632-2 and/or 632-4 and for page 634-6 on blocks 632-2 and 632-4 are received or until additional commands are received for blocks 632-1 and/or 632-3.

Figure 7:
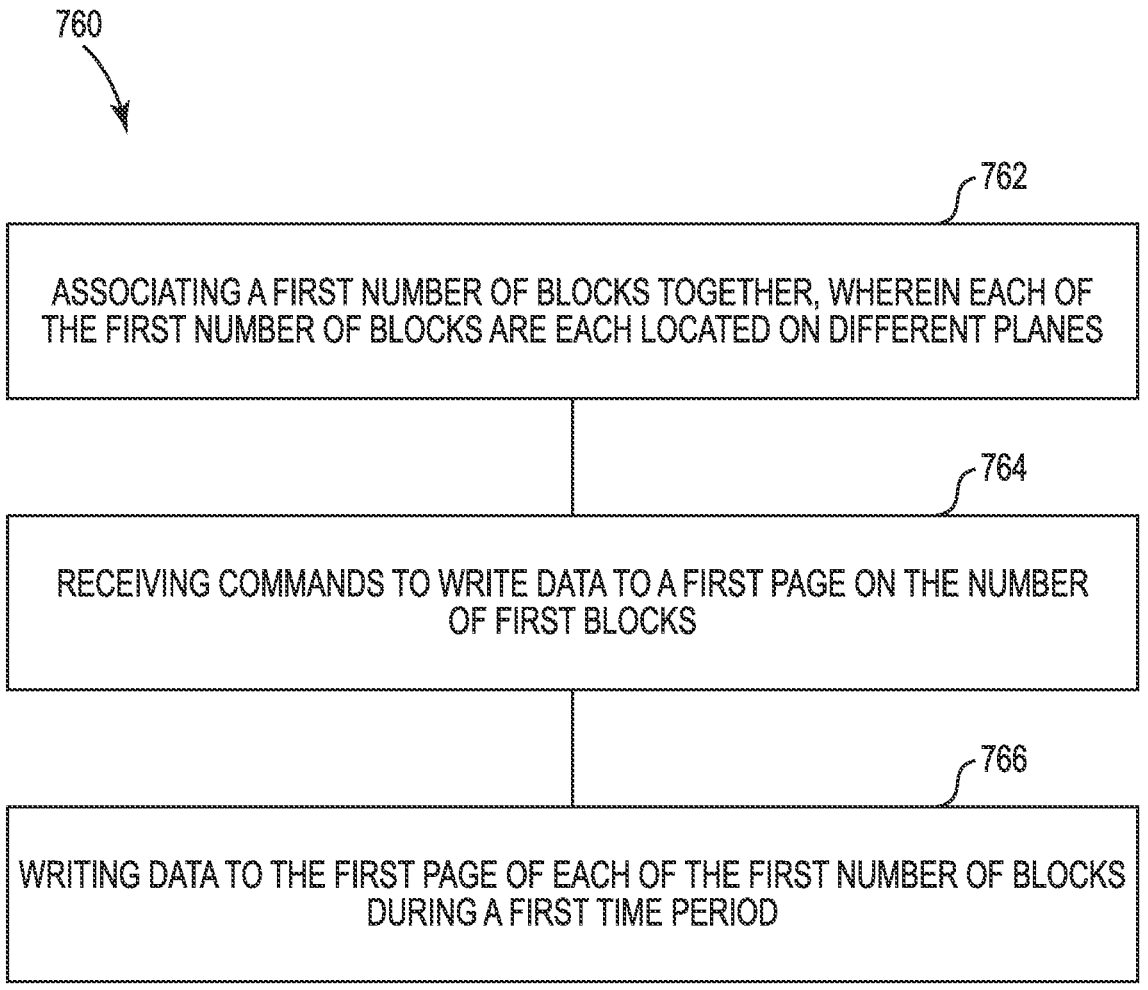
FIG. 7 is a flow diagram a method for operating a controller configured for performing write operations on a number of planes in accordance with a number of embodiments of the present disclosure.

FIG. 7 is a flow diagram a method for operating a controller configured for performing write operations on a number of planes in accordance with a number of embodiments of the present disclosure.

At 762, the method can include applying associating a first number of blocks together, wherein each of the first number of blocks are located on different planes.

At 764, the method can include receiving commands to write data to a first page on the number of first blocks. The method can further include receiving a first command to write data to the first page on a first block of the number of blocks and pausing execution of the first command until receiving the commands to write data to the first page on each of the number of blocks.

At 766, the method can include writing data to the first page of each of the first number of blocks during a first time period. The first time period is a time associated with performing a programming operation (e.g., t_prog). The method can further include pausing execution of the first command in response to the controller writing other data to another page on each of the number of blocks during a previous time period (e.g., such as a previous t_prog where write operations were performed on a page with a common page number on each of the first number of blocks simultaneously).

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
an array of memory cells;
a controller coupled to the array of memory cells and the controller includes control circuitry comprising one or more integrated circuits configured to:
associate a first number of blocks together, wherein the array of memory cells includes a number of planes, wherein each of the number of planes include a number of blocks, wherein each of the number of blocks include a number of pages, and wherein each of the first number of blocks are each located on different planes;
receive a first command to write data to a first page on a first block of the first number of blocks;
pause execution of the first command by waiting to write the data to the first page on the first block of the first number of blocks until the controller receives additional commands to write data on each of the first number of blocks;

cache the data associated with the first command in a portion of the memory array configured to write data in single level memory cells and reserved to cache data in response to the controller pausing execution of the first command until the controller receives additional commands to write data on each of the first number of blocks; and
write data to the first page of each of the first number of blocks during a first time period in response to receiving the first command and the additional commands to write data to the first page on each of the first number of blocks, wherein the first page on each of the first number of blocks have a common page number.

2. The apparatus of claim 1, wherein the controller pauses execution of the first command in response to the controller writing other data to another page on each of the number of blocks during a previous time period.

3. The apparatus of claim 1, wherein the controller is configured to receive a second command to write data to the first page on a second block of the number of blocks, and the controller is configured to pause executing the first command and the second command until the controller receives the commands to write data to the first page on each of the number of blocks.

4. The apparatus of claim 3, wherein the controller is configured to a third command to write data to the first page a third block of the number of blocks and the controller is configured to pause executing the first command, the second command, and the third command until the controller receives the commands to write data to the first page on each of the number of blocks.

5. The apparatus of claim 1, wherein the controller is configured to receive a second command to write data to a second page on the first block of first number of blocks and the controller is configured to pause executing the second command until the controller receives commands to write data to the second page on each of the first number of blocks.

6. The apparatus of claim 1, wherein the first number of blocks are associated together based on a traffic pattern in the apparatus where the controller receives write commands to write data to the common page number on each the first number of blocks before receiving a threshold number of write commands to write data to pages other than the common page number on the first number of blocks.

7. An apparatus, comprising:
an array of memory cells;
a controller coupled to the array of memory cells and the controller includes control circuitry comprising one or more integrated circuits configured to:
associate a first number of blocks together, wherein the array of memory cells includes a number of planes, wherein each of the number of planes include a number of blocks, wherein each of the number of blocks include a number of pages, and wherein each of the first number of blocks are located on different planes;
receive a first command to write data to a first page on a first block of the first number of blocks;
pause executing the first command by waiting to write the data to the first page on the first block of the first number of blocks until the controller receives a second command to write data on a first page on a second block of the first number of blocks;
cache the data associated with the first command in a portion of the memory array configured to write data in single level memory cells and reserved to cache data in response to the controller pausing execution of the first command until the controller receives the second command to write data on the first page on the second block of the first number of blocks; and write data to the first page of the first block and the first page of the second block during a first time period in response to receiving the first command and the second command, wherein the first time period is a time period for performing a write operation.

8. The apparatus of claim 7, wherein the controller is configured to receive the second command to write data to the first page of the second block of the first number of blocks and pause executing the first and second commands until the controller receives a third command.

9. The apparatus of claim 8, wherein the controller pauses execution of the first and second commands in response to receiving less than a threshold number of commands to write data to pages other than the first page of the first block and the first page of the second block prior to receiving the second command and after receiving the first command.

10. The apparatus of claim 8, wherein the controller executes the first and second commands in response to receiving at least a threshold number of commands to write data to pages other than the first page of the first block and the first page of the second block prior to receiving the second command and after receiving the first command.

11. The apparatus of claim 8, wherein the controller is configured to receive a third command to write data to a first page on a third block of the first number of blocks and pause executing the first, second, and third commands until the controller receives a fourth command.

12. The apparatus of claim 11, wherein the controller pauses execution of the first, second, and third commands in response to receiving less than a threshold number of commands to write data to pages other than the first page of the first block, the first page of the second block, and the first page of the third block prior to receiving the third command and after receiving the first command.

13. The apparatus of claim 11, wherein the controller executes the first, second, and third commands in response to receiving at least a threshold number of commands to write data to pages other than the first page of the first block, the first page of the second block, and the first page of the third block prior to receiving the third command and after receiving the first command.

14. The apparatus of claim 11, wherein the controller is configured to receive a fourth command to write data to a first page of a fourth block of the first number of blocks and execute the first, second, third, and fourth commands in response to receiving commands to write data to the first page of each of the first, second, third, and fourth blocks comprising the first number of blocks.

15. A method, comprising:

associating a first number of blocks in an array of memory cells together, wherein the array of memory cells includes a number of planes, wherein each of the number of planes include a number of blocks, wherein each of the number of blocks include a number of pages, and wherein each of the first number of blocks are located on different planes;

receiving a first command to write data to a first page on a first block of the first number of blocks;

pausing executing the first command by waiting to write the data to the first page on the first block of the first number of blocks until the controller receives a second command to write data on a first page on a second block of the first number of blocks;

caching the data associated with the first command in a portion of the memory array configured to write data in single level memory cells and reserved to cache data in response to the controller pausing execution of the first command until the controller receives the second command to write data on the first page on the second block of the first number of blocks; and writing data to the first page on the first block and the first page on the second block during a first time period in response to receiving the first command and the second command, wherein the first time period is a time period for performing a write operation.

16. The method of claim 15, further including pausing execution of the first command in response to the controller writing other data to another page on each of the first number of blocks during a previous time period.

* * * * *